United States Patent [19]

Logstrup et al.

[11] Patent Number: 4,559,413
[45] Date of Patent: Dec. 17, 1985

[54] RAIL INSULATOR FOR THE SECURING OF A CONDUCTOR RAIL ON A RAIL SUPPORT

[75] Inventors: Jørgen Løgstrup, Snekkersten; Preben C. Sparre, Espergaerde, both of Denmark

[73] Assignee: A/S Logstrup-Steel, Snekkersten, Denmark

[21] Appl. No.: 598,330

[22] PCT Filed: Aug. 12, 1983

[86] PCT No.: PCT/DK83/00076
§ 371 Date: Mar. 12, 1984
§ 102(e) Date: Mar. 12, 1984

[87] PCT Pub. No.: WO84/00842
PCT Pub. Date: Mar. 1, 1984

[30] Foreign Application Priority Data

Aug. 20, 1982 [DK] Denmark ............................ 3733/82

[51] Int. Cl.$^4$ ...................... H01B 17/18; H02G 5/00
[52] U.S. Cl. ............................ 174/163 R; 174/149 B; 174/174
[58] Field of Search ............... 174/68 B, 70 B, 99 B, 174/149 B, 156, 171, 158 R, 163 R, 174; 248/68.1; 361/341, 342, 355, 361, 378

[56] References Cited

U.S. PATENT DOCUMENTS 2,310,919 2/1943 Adam ................................. 174/99 B
2,445,463 7/1948 West .............................. 174/149 B X
2,966,540 12/1960 Christensen ................. 174/99 B X
3,003,021 10/1961 Christensen ...................... 174/99 B

FOREIGN PATENT DOCUMENTS 486754 4/1970 Switzerland ................... 174/149 B
1085372 9/1967 United Kingdom ............. 174/99 B
1143601 2/1969 United Kingdom .

Primary Examiner—Laramie E. Askin
Attorney, Agent, or Firm—Merchant, Gould, Smith, Edell, Welter & Schmidt

[57] ABSTRACT

A rail insulator (5) for the securing of a conductor rail (2) on a rail support (4) which comprises a substantially U-shaped supporting rail in which holes are provided at regular intervals, preferably in two parallel rows, and where the rail insulator (5) is formed with a notch (18) corresponding to the thickness of the rail being used, is arranged so that on the side turning away from the notch it has outwardly-extending, hook-formed holding elements (24, 25) arranged to grip around and be secured to the rail support (4), in that between the holding elements there is provided a guide stud (30) which fits down into one of the holes in one of the rows of holes. One thus obtains a rail insulator which is well-suited for use in the building up of rail areas, in that the rail insulator can quickly and easily be removed and mounted on the rail support without detracting from the strength and the ability of the rail area to absorb mechanical forces from changes in current.

2 Claims, 10 Drawing Figures

RAIL INSULATOR FOR THE SECURING OF A CONDUCTOR RAIL ON A RAIL SUPPORT

This invention relates to a rail insulator for the securing of conductor rail on a rail support.

Many different forms of rail insulators are known for the building up of rail areas, for example for use in metal-enclosed electrical systems and in power supply installations of similar kind. The rail insulator in accordance with the invention finds application not only in the supply of current or the distribution of power, but also for pilot wires and control leads, for example such as those used in electrical installations in various concerns and the like.

As disclosed in British Pat. No. 1,085,372, a module building set is known for the building up of electrical rail areas by the assembling together of rail supports and insulators. The rail supports have notches in which the insulators are placed. One must thus have different supports, all depending on how many conductors there are to be used in the actual installation, and if many conductors are to be led forward, it is easy to obtain a mechanical construction which is not strong and stable enough if great changes occur in the current in the conductors, in that the dynamic forces must be transferred by the rail supports.

From the Swiss patent publication No. 486,754 is known another module building set for the building up of rail areas, wherein one uses a series of different forms of rail insulators of plastic which can be assembled so that they surround the rail and are secured by a bolt extending from rail support to rail support. It is thus necessary to have a large number of rail insulators in order to be able to build up a rail area in which are used conductor rails of different dimensions.

As disclosed in U.S. Pat. No. 2,445,463, there are known rail insulators for mounting on rail supports which are substantially U-shaped, in that the rail insulator is formed to be secured on the rail support by means of one or more bolts which are secured in threaded holes in the insulator, and pass through holes in the rail support. One thus achieves a reasonably solid construction, but an installation which is troublesome to change, because a large number of bolts have to be completely screwed out during the dismantling and screwed in again in forming the new assembly.

As disclosed in U.S. Pat. No. 2,310,919, there are known rail insulators which are designed to be fastened to a rail support by screws, each of such insulators being provided with a notch which corresponds to the thickness of the rail being used. Also in this case the method of securing the rail insulator is unfortunate when it comes to changing the installation, the reason being that each insulator is fastened directly to the rail support by means of screws.

The object of the invention according to the present application is to provide a rail insulator for use in the building up of rail areas in which the insulators can be removed from and mounted on the rail support quickly and easily, and without diminishing the strength and the ability of the construction to absorb mechanical forces from changes in current.

In one embodiment, it is possible to mount rail insulators on the rail support wherever this may be desired. Moreover, if the spaces between the rail insulators are filled out with distance pieces, or if the insulators are arranged completely up against each other, a very rigid and mechanically stable construction is achieved in which the dynamic forces can be transferred through the adjacent insulators. Since the rail support has holes along the whole of its length, one can always distribute the conductor rails uniformly across the whole of the support, so that the mechanical effects from the electric current are the least possible.

According to a further aspect of the invention, the conductor rail can be bolted securely to the rail support or between two rail supports, all depending on the size of the conductor rail and the current which has to run through the rail. Thus it is possible to use the same rail support for all sizes and forms of rail areas. Similarly, the rail insulator can be used for conductor rails of many different dimensions, in that the bolts merely need to be of different lengths.

The invention will now be described in more detail with reference to the drawing which shows various embodiments of the invention, and where FIG. 1 shows an elevational view, partly in cross-section, seen from the end of a part of a rail area for very heavy currents, built up with the rail insulator according to the invention, FIG. 2 shows a side elevation, partly in cross-section, seen from the end of a part of a rail area for heavy currents, built up with rail insulators according to the invention, FIG. 3 shows a side elevation shown partly in cross-section, of a part of a rail area for smaller currents, built up with rail insulators according to the invention, FIG. 4 shows an insulating housing for the insulation of a bolt head, FIG. 5 shows a part of a rail support, FIG. 6 shows the rail support in FIG. 5, but seen in the direction VI—VI, FIG. 7 shows a side view of a rail insulator, FIG. 8 shows in detail, partly in cross-section, how a conductor rail is bolted to a rail support, corresponding to the embodiment in FIG. 2.

Figure 1:
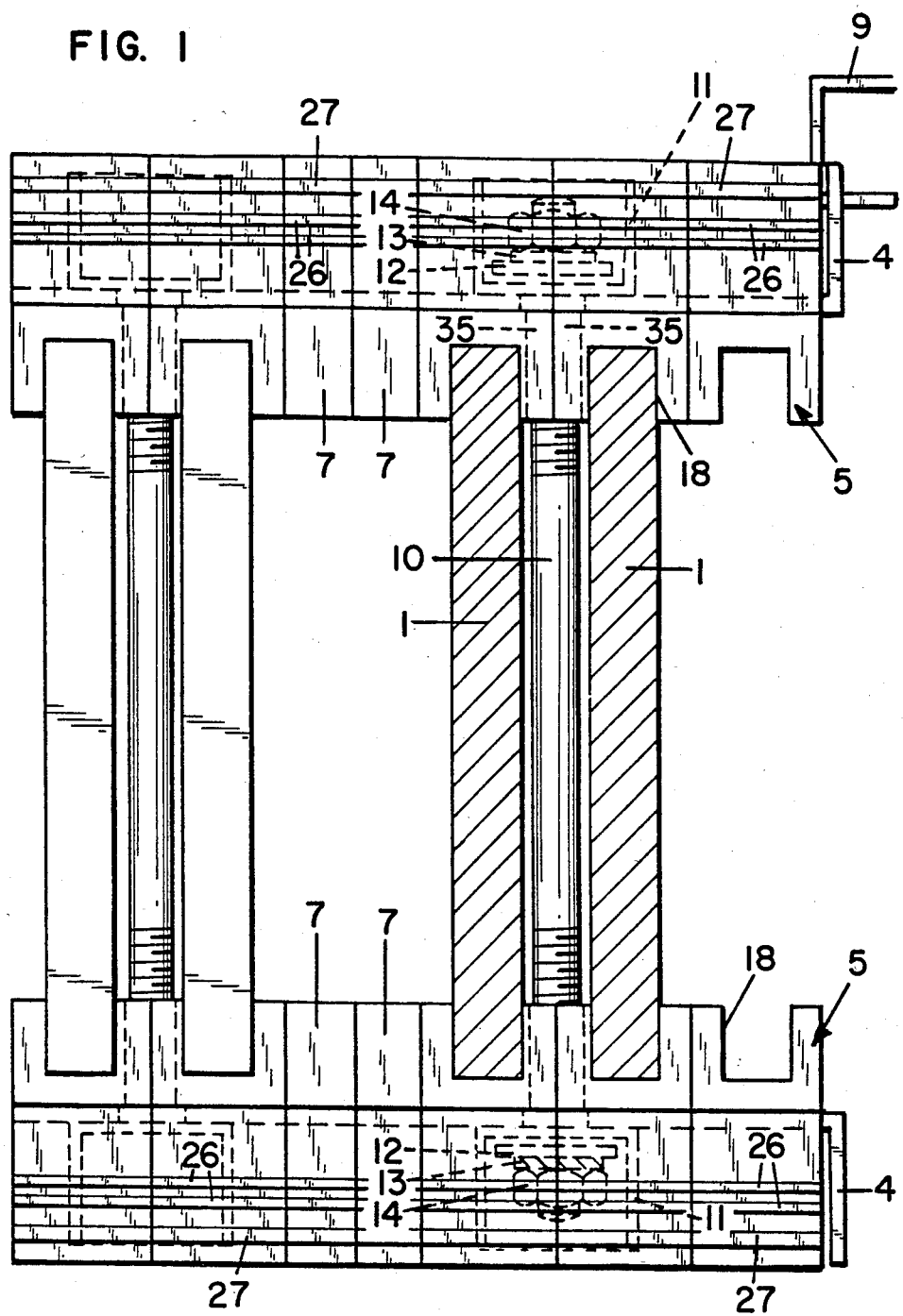

In FIG. 1 is seen a double phase rail 1, each of the copper rails being capable, for example, of carrying 1500 Amps, and thus a total of 3000 Amps. Each rail is secured by its own rail insulator 5, each having a smooth, rectangular notch 18 which corresponds precisely to the rail. Copper rails of this kind are normally produced in module measurements of 6 mm, i.e. the thickness of the rail is a multiple of six. In the case shown in the drawing, the phase rail is 12 mm thick and approx. 130 mm high, which corresponds to a phase rail capable of carrying 1500 Amps. For different current intensities there are produced and used rails with different heights but of the same thickness, so that the same size of insulator 5 can be used for many different conductor rails for different current intensities. The rail insulator 5, also called a rail shoe, is secured to a rail support 4 comprising a U-shaped supporting rail which is shown in detail in FIGS. 5 and 6. The supporting rail is a formed metal rail with several rows of holes, and having in each end an end piece which can engage with and be secured to a securing bracket 9. In the middle of the rail support there is a series of holes 32 through which a securing bolt 10 can be introduced, and two parallel rows of smaller holes 31, every alternate of these holes lying opposite eno of the larger holes 32.

The smaller holes 31 are intended for the guide stud on the rail insulator or a distance piece, which will be explained later.

Figure 4:
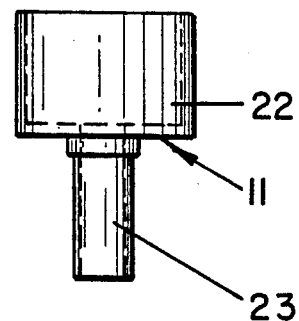

In FIG. 1 it will also be seen that between the two phase rails 1 and the next phase rail are mounted distance pieces 7 between the rail insulators 5, so that the rail support 4 with rail insulators 5 and distance pieces 7 comprise a solid, firm and rigid beam which supports the phase rails 1. This construction prevents any lateral displacement of the rail insulators 5 and thus also lateral displacement of the phase rails. The rail insulator 5 is secured firmly against the conductor rail 1 by a bolt 10, which similarly tightens the two rail supports in towards each other. At each end of the bolt there is a nut 14, a locking or friction washer 13 and a washer 12, which parts lie down in a housing 11 formed of insulating material. This can be seen in detail in FIG. 4. The insulating bolt housing 11 comprises a hollow part 22 in which the nut or bolt head 17 (see FIGS. 2 and 8) and the different washers can be received, and a hollow part 23 in which the shaft of the bolt can be received.

Figure 7:
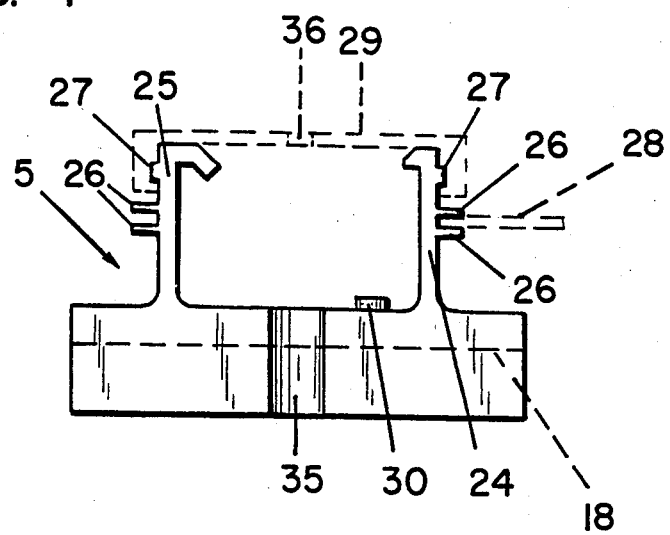
Figure 8:
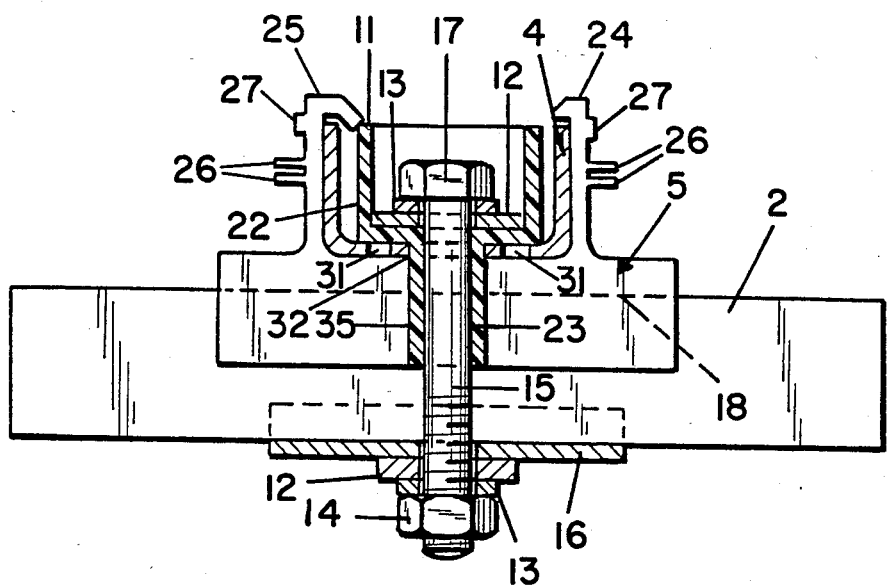
Figure 9:
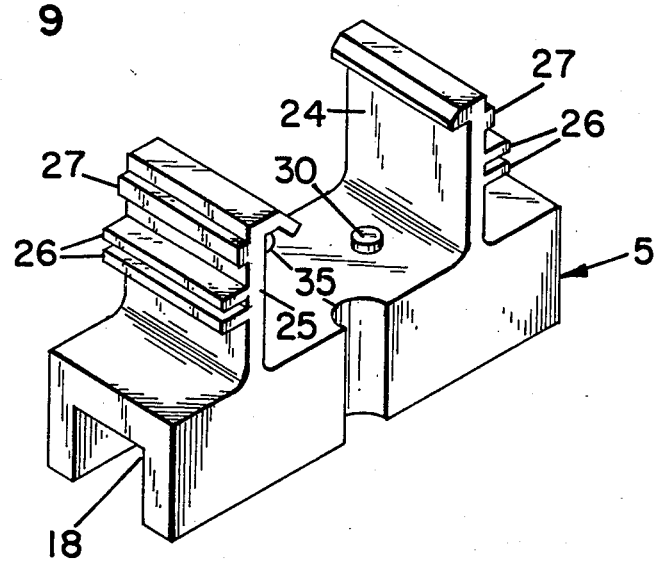
FIG. 9 shows a perspective view of a rail insulator.

In FIGS. 7-9 it will be seen that in each side of the rail insulator 5 there is formed an arcuate recess 35, so that two rail insulators lying adjacent to each other form a hole in which the lower part of the insulator's bolt housing can be received. This can be seen more clearly in FIG. 8. The shaft of the bolt 10 does not need to be insulated, the reason being that it extends between the two uninsulated rails 1 which carry the same voltage. The insulating bolt housing increases the leakage distance from the nut or bolt head and to the rail support, hereby preventing the occurrence of leakage current.

Figure 5:
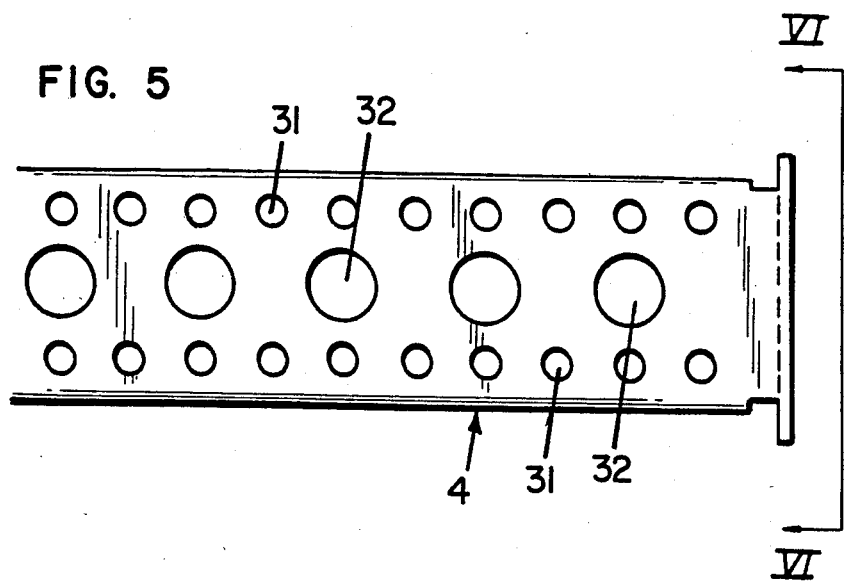
Figure 6:
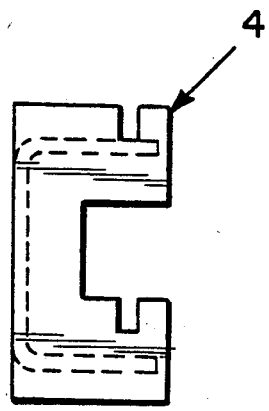

Preferably, the rail insulators 5 are 24 mm broad, and the distance pieces 7 are preferably 12 mm broad, so that on the rail support 4, see FIG. 5, there is a distance of 12 mm between the small holes in the two parallel rows and 24 mm between the large holes, thus enabling rail insulators and distance pieces to be mounted between each other as desired, while still achieving a very solid fastening of the conductor rail which can withstand the very strong forces which arise between the conductors as a result of short-circuit currents or high surges of cut-in current.

Figure 2:
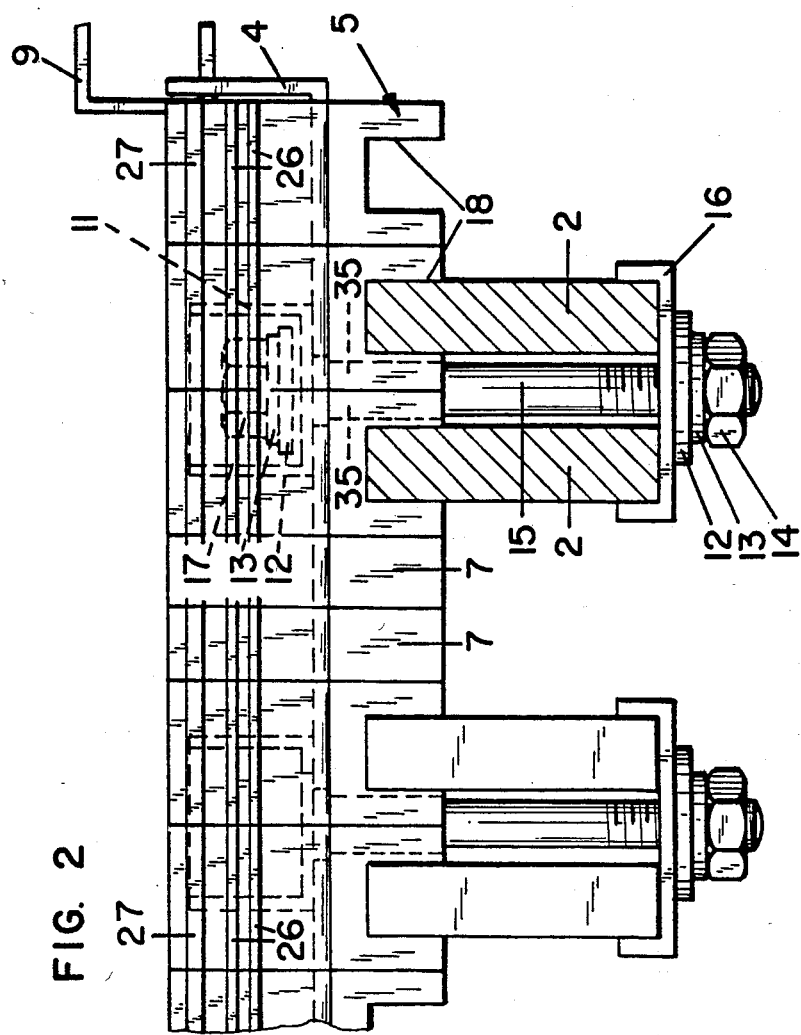

FIG. 2 shows the same parts as in FIG. 1, but used for one-sided securing of a pair of rails 2 for current intensities in the range of 2×1000 Amps. The conductors rails have a height of approx. 50 mm and thus a copper cross-sectional area of 600 mm². With these current intensities it is sufficient with one rail support 4, so that one merely uses a shorter bolt 15 together with a rail holder 16 which is secured by the bolt.

Figure 3:
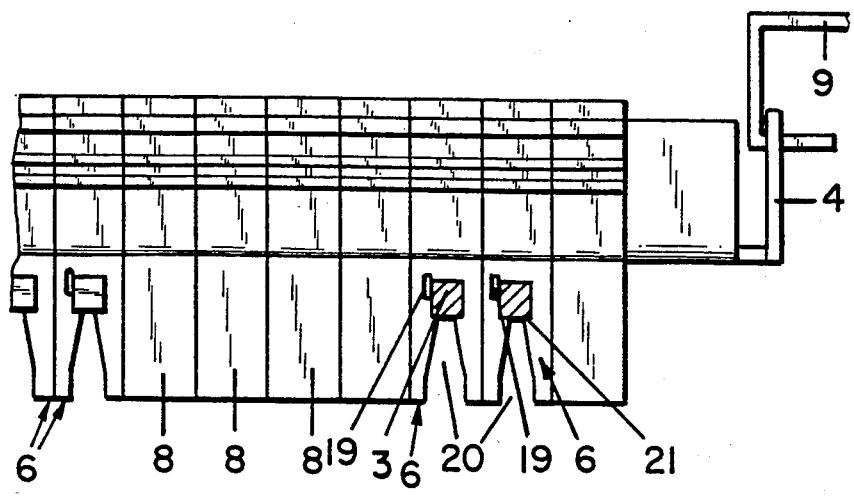
Figure 10:
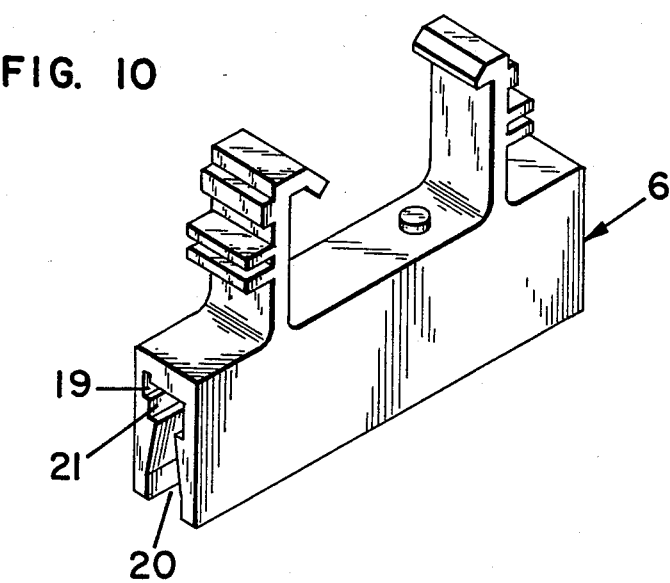
FIG. 10 shows a perspective view of an alternate rail insulator.

With currents of lower intensities, for example in the range below 125 Amps, one can use a rail insulator 6 as shown in FIG. 3 and FIG. 10, where the notch 21 which must carry the conductor rail 3 is provided with a narrowed-down opening 20, so that one or two locking edges are formed. In order for the locking edges to be suitably flexible during the insertion or removal of a rail 3, the notch 21 can be provided with an extra notch or recess 19. In FIG. 3 there is shown a 6×6 mm copper rail for a maximum of 125 Amps, but it will be obvious that rail insulators can also be formed for small, rectangular rails of, for example, 6×12 mm or larger. After so many distance pieces 8 have been inserted so that the rail support 4 is completely filled up, the conductor rails 3 will be locked, the reason being that the lobes of the rail insulators cannot be bent to the side before one or more of the distance pieces 8 have been removed.

In detail in FIGS. 7-9 can be seen how a rail insulator 5 is formed. The distance pieces 7 and 8 shown in the earlier figures have substantially the same cross-section, but merely without the notch 18 or 21 for the conductor rail.

In FIG. 7 and FIG. 9 it will be seen that the rail insulator 5 to the one side has an oblong notch 18 for the conductor rail, and that in this side there are provided the arcuate recesses 35 for bolt and bolt housing. On the other side there are provided two outwardly extending hook-formed flanges 24 and 25, said flanges being arranged to grip around and hold firmly on the rail support, see FIG. 8. Between the flanges is seen a stud 30 which fits into the small holes 31 in one of the two parallel rows of holes in the rail support. The stud 30 is disposed in such a manner that it makes no difference how the insulator 5 is turned, in that apart from the stud 30 and the hooks of slightly different shape on the flanges, it is completely symmetric in form. The flanges 24 and 25 can also be provided with holding lugs 27 for an insulating cover 29 for covering the bolt heads 17 and the rail support, and on which there can be provided marking 36 for the relevant conductor. Moreover, by providing the flanges 24 and 25 with holding elements 26 for an insulation cover 28, one can mount said insulation covers 28 between the individual rail supports for covering over the conductor rails.

FIG. 8 shows a cross-section in a rail support precisely through a securing point for one conductor rail for currents of average intensity, for example corresponding to FIG. 2. It can be seen how the bolt 15 secures a rail 2 to the rail support 4 by means of nut 14 and rail holder 16. The bolt housing 11 surrounds the bolt head 17 inside the U-shaped rail support and prevents leakage current from running from the bolt to the rail support. The lower part 23 of the bolt housing 11 reaches exactly as far down as the rail insulator 5. It can also be seen how the hook-formed flanges have hooks which differ slightly in shape, so that they both sit sufficiently firmly and are sufficiently easy to remove and attach to the rail support.

The rail insulators 5, 6, the distance pieces 7, 8 and the bolt housing 11 are produced by form moulding of an insulating material, preferably of a material such as Arylef U100 manufactured by Solvay & Cie, Rue de Ransbeek, 310 Brussels, Belgium which has good insulating characteristics as well as being well-suited for form moulding.

By forming a module building set as described above, with a few different parts it is possible to build up any desired coupling configuration in a rail field, for both high and low current intensities and for both power distribution as well as control purposes.

We claim:

1. A rail insulator for the securing of a conductor rail on a rail support, which rail support comprises a substantially U-shaped supporting rail having rows of regularly spaced holes, the rail insulator comprising: a body portion having a bottom, a top, two sides, and two ends, said bottom of said body portion having a notch extending thereacross from one end of the body portion to the other end of the body portion for receiving the edge of a conductor rail, said body portion on its top having upwardly-extending, hook-shaped holding elements which are arranged to grip around and be secured to the rail support; and a guide stud located on the top of said body portion between the holding elements for fitting into one of the holes of the rail support.

2. A rail insulator according to claim 1, further characterized in that a recess with arcuate cross-section for partially encircling a bolt is provided in the middle of one of the sides of the body portion, said recess extending from the top to the bottom of the body portion.

* * * * *